United States Patent Office 3,763,168
Patented Oct. 2, 1973

3,763,168
N-(3-QUINUCLIDINYL) ACYLANILIDES
Philip M. Carabateas, Schodack, N.Y., assignor to Sterling Drug Inc., New York, N.Y.
No Drawing. Original application Sept. 9, 1968, Ser. No. 758,924, now Patent No. 3,655,675. Divided and this application Aug. 2, 1971, Ser. No. 168,483
Int. Cl. C07d 39/06
U.S. Cl. 260—293.53      3 Claims

ABSTRACT OF THE DISCLOSURE

An N-[1-Z-4(or 3)-piperidyl]acylanilide, having antidiarrheal utility, is prepared by reacting an N-[4(or 3)-piperidyl]acylanilide with a Z-halide or by reacting a 4(or 3)-(Q-anilino)-1-Z-piperidine with an acyl halide or anhydride, where Z is lower-alkyl, 3-cyano-3,3-diphenylpropyl or 2-cyanoethyl, acyl is propionyl, lactyl, dichloroacetyl or carbethoxy, and Q is hydrogen or (halo)$_n$ where halo is fluoro or chloro and $n$ is 1 or 2. Also included are corresponding N-[4(or 3)-pyridyl]-, N-(3-quinuclidinyl)-, and N-(8-Z-3-nortropanyl)-acylanilides.

---

This application is a division of my prior copending application Ser. No. 758,924, filed Sept. 9, 1968, now U.S. Pat. 3,655,675.

This invention relates to compositions of matter known in the art of chemistry as N-(N-heteryl)-acylanilides and to their preparation.

The invention in one composition aspect resides in an N-[1-Z-4(or 3)-piperidyl]acylanilide having the Formula I

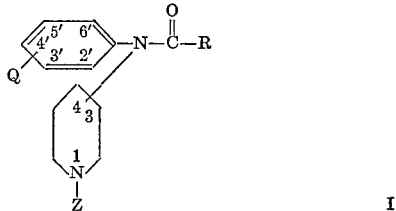

where Q is hydrogen or (halo)$_n$ where halo is fluoro or chloro and $n$ is 1 or 2, R is $C_2H_5$, $CH(OH)CH_3$, $OC_2H_5$ or $CHCl_2$, and Z is lower-alkyl, 3-cyano-3,3-diphenylpropyl or 2-cyanoethyl. The compounds of this composition aspect of the invention having Formula I, when tested according to standard pharmacological evaluation procedures in animals, have been found to possess the inherent applied use characteristics of having antidiarrheal activity, and thus they are useful as antidiarrheal agents.

"Lower-alkyl," as used herein, is an alkyl radical, preferably having from one to six carbon atoms, which can be arranged as straight or branched chain, including, for instance, but without limiting the generality of the foregoing, methyl, ethyl, n-propyl, isopropyl, 2-butyl, isobutyl and hexyl.

The invention sought to be patented in a process aspect is described as residing in the process of preparing the compound of Formula I which comprises reacting a 4(or 3)-(Q-anilino)-1-Z-piperidine with an acylating agent, i.e., an acyl halide of the formula R—CO—halogen or an acyl anhydride of the formula (R—CO)$_2$O where Z and Q are defined as above for Formula I and R is $C_2H_5$, $CH(OH)CH_3$ $CHCl_2$ or $OC_2H_5$ (for acyl halide only) or optionally, reacting a N-(4- or 3-piperidyl)acylanilide of the Formula II

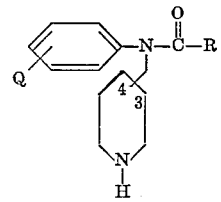

with an alkylating agent of the formula Z-halide, preferably in the presence of an acid-acceptor.

The final products of Formula I of the invention, as well as those of Formulas III and IV hereinbelow, are useful in the free base form or in the form of their acid-addition salts, and both forms are within the purview of the invention, and are considered to be one and the same invention. The acid-additional salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

Also encompassed by the invention are quaternary ammonium salts of the compounds of Formulas I, III and IV, quaternization forming at the 1-position of the piperidine ring. These salts are useful for further identification of the aforesaid compounds. The quaternary ammonium salts are obtained by the addition of esters having a molecular weight less than about 200 to the free base form of the compounds. A preferred class of esters comprises lower-alkyl, lower-alkenyl having three to six carbon atoms or benzyl esters of inorganic acids or organic sulfonic acids of the formula Z'-An' where Z' is lower-alkyl, lower-alkenyl having three to six carbon atoms or benzyl and An' is an anion of a strong acid. Z' when benzyl can be substituted in the benzene ring by from one to three substituents illustrated by, but not limited to lower-alkyl, lower-alkoxy, halo, nitro, lower-alkylamino, lower-alkylmercapto, and the like. Z'-An' is thus illustrated by, but not limited to methyl chloride, methyl bromide, methyl iodide, ethyl bromide, propyl chloride, 2-hydroxyethyl bromide, allyl chloride, allyl bromide, methyl sulfate, methyl benzenesulfonate, methyl 4-toluenesulfonate, benzyl chloride, benzyl bromide, 4-chlorobenzyl chloride, 4-nitrobenzyl chloride, o-chlorobenzyl chloride, 3,4-dichlorobenzyl chloride, 4-methoxybenzyl chloride, and the like. The quaternary ammonium salts are prepared by mixing the free base and the lower-alkyl, lower-alkenyl or benzyl esters in an organic solvent inert under the conditions of reaction, for example, ethanol, methanol, ether, acetonitrile and the like, or alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

The nature of the starting materials, mode of synthesis, results of elementary analyses, examination of the final products of Formula I by infrared and nuclear magnetic resonance spectrographic analyses, all taken together, confirm the molecular structure assigned to these compounds.

The manner and process of making and using the invention will now be generally described so as to enable a person skilled in the art of medicinal chemistry to make and use the same, as follows:

The intermediates used in the process aspect of the invention are either known or are readily prepared by conventional methods. For example, the 4(or 3)-(Q-anilino)-1-Z-piperidines are prepared by the following known procedure starting with known 1-Z-4(or 3)-piperidones as follows: A 1-Z-4(or 3)-piperidone is reacted with Q-aniline to form 1-Z-4(or 3)-[(Q-phenyl)imino]piperidine which is then reduced with an appropriate reducing agent, e.g., sodium borohydride, amalgamated aluminum or by catalytic hydrogenation using for example platinum dioxide, palladium-on-charcoal or Raney nickel as the catalyst, to form the corresponding 4(or 3)-(Q-anilino)-1-Z-piperidine. The N-4-piperidyl-acylanilides are prepared by different known methods. One method involves the steps of reacting 1-benzyl-4(or 3)-piperidone with Q-aniline to form 1-benzyl-4(or 3)-[(Q-phenyl)imino]piperidine, reacting the imino compound with an appropriate reducing agent, e.g., sodium borohydride, to form the corresponding 1-benzyl-4(or 3)-(Q-anilino)piperidine, acylating the latter by reacting with the appropriate acyl anhydride or acyl halide to form an N-[1-benzyl-4(or 3)-piperidyl]acylanilide and catalytically hydrogenating the latter compound using a suitable catalyst, e.g., palladium-on-charcol, to remove the 1-benzyl substituent. Another method of preparing the 4-(Q-anilino)-1-Z-piperidines consists of the following generally known steps: reacting an 4-halopyridine with Q-aniline to form a 4-(Q-anilino)pyridine, reacting said anilinopyridine with an acyl anhydride or acyl halide to form the corresponding N-(4-pyridyl)acylanilide, reacting the latter compound with an alkylating agent of the formula Z-halogen to form a 4-[N-(Q-phenyl)acylamido]-1-Z-pyridinium halide and reacting the said pyridinium halide with sodium borohydride to form the corresponding 4-(Q-anilino)-1-Z-piperidine. Note in the last step that the acyl group was removed along with the reduction of the pyridine ring to piperidine. An attempt to carry out the last step using a 3-[N-(Q-phenyl)acylamido]-1-Z-pyridinium halide in place of a 4-[N-(Q-phenyl)acylamido]-1-Z-pyridinium halide did not remove the acyl group and only partially reduced the pyridine ring, resulting in a mixture of products which were then catalytically hydrogenated to yield the corresponding N-(1-Z-3-piperidyl)acylanilide.

The above-noted intermediate N-[4(or 3)-pyridyl]-acylanilides also were found to have antidiarrheal activity and constitute another aspect of the invention. These compounds have the formula corresponding to Formula I but have 4(or 3)-pyridyl in place of 1-Z-4(or 3)-piperidyl.

The final products of Formula I are prepared by reacting a 4(or 3)-(Q-anilino)-1-Z-piperidine with an acylating agent, e.g., an acyl halide of the formula RCO-halogen or an acyl anhydride of the formula (R—CO)$_2$O where Q, Z and R are defined as hereinabove or by reacting an N-[4(or 3)-piperidyl]-acylanilide of Formula II with an alkylating agent of the formula Z-halide, preferably in the presence of an acid-acceptor, e.g., triethylamine, sodium methoxide, potassium ethoxide, sodium carbonate, potassium carbonate, and the like, and a non-aqueous inert solvent, e.g., chloroform, tetrahydrofuran, toluene, benzene, dimethylformamide, and the like. The acylation is carried out either with or without an inert solvent such as chloroform, benzene, toluene, ethyl acetate, methylene dichloride, and the like. The compounds where R is $C_2H_5$ are conveniently prepared by heating on a steam bath propionic anhyride and the appropriate 4(or 3)-(Q-anilino)-1-Z-piperidine. The compounds where R is $CHCl_2$ are preferably prepared by reacting at room temperature or below dichloroacetyl chloride with the apropriate 4(or 3)-(Q-anilino)-1-Z-piperidine in a suitable inert solvent, e.g., chloroform. The compounds where R is $OC_2H_5$ are preferably prepared by warming ethyl chloroformate and the appropriate 4(or 3)-(Q-anilino)-1-Z-piperidine in an inert solvent, e.g., chloroform under reflux. The compounds where R is $CH(OH)CH_3$ are preferably prepared by reacting the appropriate N-[4(or 3)-piperidyl]-lactanilide with Z-halide in an inert solvent, e.g., chloroform, tetrahydrofuran, and the like, in the presence of an acid-acceptor, e.g., triethylamine, sodium methoxide and the like; the reaction is conveniently run at room temperature (25–30° C.). The compounds where R is $C_2H_5$, $CHCl_2$ or $OC_2H_5$ also are conveniently prepared by reacting, preferably at room temperature in an inert solvent, the appropriate N-[4(or 3)-piperidyl]acylanilide with Z-halide in the presence of an acid-acceptor; alternatively the reaction can be carried out at a higher temperature up to about 100° C.

Other composition aspects of the invention are the corresponding N-(3-quinuclidinyl)acylanilides and N-(8-Z-3-nortropanyl)acylanilides of Formulas III and IV respectively:

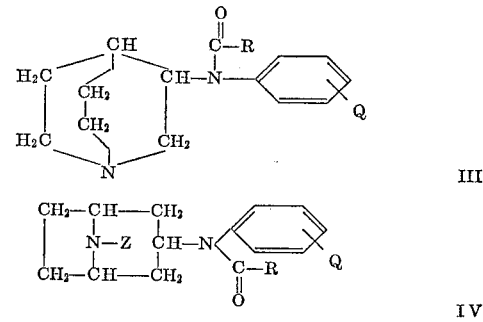

where R, Q, and Z are defined as hereinabove for Formula I. These compounds, like those of Formula I, have antidiarrheal activity and are readily prepared, as above for the compounds of Formula I, by reacting the corresponding 3-(Q-anilino)quinuclidine or 3-(Q-anilino)-1-Z-nortropane, respectively with the appropriate acylating agent. The intermediate 3-(Q-anilino)quinuclidine or 3-(Q-anilino)-1-Z-nortropane is prepared in two steps by reacting 3-quinclidinone or 8-Z-nortropinone with Q-aniline to form a 3-(Q-phenylimino)quinuclidine or 3-(Q-phenylimino)-8-Z-nortropane and reducing the latter as described above, e.g., with sodium borohydride, to form said 3-(Q-anilino)quinuclidine or 3-(Q-anilino) - 8 - Z-nortropane.

The compounds of Formulas I, III, and IV, and the corresponding N-[4(or 3)-pyridyl]acylanilides noted hereinabove all can be represented by Formula V

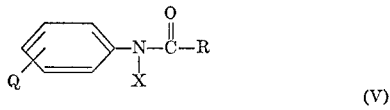

where Q and R are defined as hereinabove for Formula I and the X is 1-Z-4(or 3)-piperidyl, 4(or 3)pyridyl, 3-quinuclidinyl or 8-Z-3-nortropanyl where Z is defined as above for Formula I. As noted above, the compounds of Formula V are prepared by reacting the corresponding compound of Formula VI

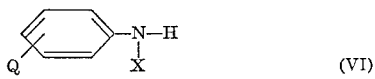

with the appropriate acylating agent, as described above in the preparation of the compounds of Formula I, where Q and X are defined as above for Formula V.

The best mode contemplated for carrying out the invention will now be set forth as follows:

(A) 1-Z-4(OR 3)-(Q-PHENYLIMINO)PIPERIDINES (1) 1-methyl-4-phenyliminopiperidine.—A mixture containing 22.6 g. of 1-methyl-4-piperidone, 20 g. of aniline, 90 ml. of toluene and 0.5 ml. of glacial acetic acid was refluxed with a continuous separator connected to the reaction vessel for removal of water formed by the reaction. After about ninety minutes, 3.6 ml. of water had been collected (theory 3.6 ml.). The reaction mixture was then concentrated in vacuo to remove the toluene and the remaining only residue was distilled under reduced pressure to yield 31.5 g. of 1-methyl-4-phenyliminopiperidine, B.P. 100–105° C. at 0.15 mm.

(2) 4-(4-chlorophenylimino)-1-methylpiperidine, B.P. 92–112° C. at 0.2 mm., 25.9 g., was prepared as in Example A–1 using 17.0 g. of 1-methyl-4-piperidine, 21.0 g. of 4-chloroaniline, 70 ml. of toluene, 0.5 ml. of acetic acid and a reflux period of fifteen hours.

(3) 4-(4-fluorophenylimino)-1-methylpiperidine, B.P. 51–52° C. at 0.005 mm., 23.0 g., was prepared as in Example A–1 using 17.0 g. of 1-methyl-4-piperidone, 17.2 g. of 4-fluoroaniline, 70 ml. of toluene, 0.5 ml. of acetic acid and a reflux period of seventeen hours.

(4) 4-(3-fluorophenylimino)-1-methylpiperidine, B.P. 72–73° C. at 0.20–0.21 mm., 26.9 g., was prepared as in Example A–1 using 25.5 g. of 1-methyl-4-piperidone, 25.0 g. of 3-fluoroaniline, 150 ml. of toluene, 0.5 ml. of acetic acid and a reflux period of six hours.

(5) 4 - (3,4-dichlorophenylimino)-1-methylpiperidine, B.P. 80–83° C. at 0.01 mm., 42.5 g., was prepared as in Example A–1 using 22.6 g. of 1-methyl-4-piperidone, 33.2 g. of 3,4-dichloroaniline, 150 ml. of toluene, 0.5 ml. of acetic acid and a reflux period of seventeen hours.

(6) 4 - (2-fluorophenylimino)-1-methylpiperidine, B.P. 85–94° C. at 0.15–0.20 mm., 36.4 g., was prepared as in Example A–1 using 25.5 g. of 1-methyl-4-piperidone, 25.0 g. of 2-fluoroaniline, 100 ml. of toluene, 0.5 ml. of acetic acid and a reflux period of eighteen hours.

Following the procedure described in Example A–1 but using the appropriate 1-Z-4(or 3)-piperidine and Q-aniline, the following 1-Z-4(or 3)-(Q - phenylimino)piperidines are prepared:

(7) 1-ethyl-4-phenyliminopiperidine.
(8) 4-(3,4-difluorophenylimino)-1-methylpiperidine.
(9) 4-(2,4-dichlorophenylimino)-1-methylpiperidine.
(10) 1-(3-cyano-3,3-diphenylpropyl)-4-(2,4 - difluorophenylimino)piperidine.
(11) 1-n-hexyl-4-phenyliminopiperidine.
(12) 4-(2-chlorophenylimino)-1-methylpiperidine.
(13) 3-(2-fluorophenylimino)-1-methylpiperidine.
(14) 3-(2,4-difluorophenylimino)-1-methylpiperidine.
(15) 1-ethyl-3-(2-fluorophenylimino)piperidine.
(16) 1-(3-cyano-3,3-diphenylpropyl) - 3 - (2 - fluorophenylimino)piperidine.

(B) 1-Z-4(OR 3)-(Q-ANILINO)PIPERIDINES (1) 4-anilino-1-methylpiperidine.—To a solution containing 31 g. of 1-methyl-4-phenyliminopiperidine in 350 ml. of methanol was added in portions with stirring 9.5 g. of sodium borohydride. The reaction mixture was stirred for thirty minutes after completion of the addition and was then refluxed for thirty minutes and concentrated in vacuo to remove the methanol. About 200 ml. of water was added to the white solid residue and the solid was collected. The solid was then suspended in water and the mixture heated almost to boiling whereupon the solid melted and then resolidified on cooling. The solid was collected and dried over phosphorous pentoxide to yield 29.4 g. of 4-anilino-1-methylpiperidine, M.P. 81–83° C.

(2) 4 - (4-chloroanilino)-1-methylpiperidine.—A mixture containing 4.4 g. of sodium borohydride and 150 ml. of ethanol was stirred for about thirty minutes and to the mixture was then added 25.9 g. of 4-(4-chlorophenylimino)-1-methylpiperidine and the resulting mixture was stirred for three hours at room temperature. The ethanol was distilled off in vacuo and about 250 ml. of water was added to the residue. The aqueous mixture was stirred for several hours and extracted three times wtih chloroform. The chloroform extract was washed with brine and the chloroform distilled off in vacuo. The remaining residue slowly crystallized and was recrystallized twice from cyclohexane and dried in vacuo at room temperature (about 25–30° C.) to yield 10.4 g. of 4-(4-chloroanilino)-1-methylpiperidine, M.P. 88–90° C.

(3) 4 - (4-fluoroanilino)-1-methylpiperidine, M.P. 91–93° C., 6.4 g., was prepared as in Example B–2 using 4.2 g. of sodium borohydride, 150 ml. of ethanol, 23.0 g. of 4-(4-fluorophenylimino) - 1 - methylpiperidine, ether instead of chloroform in the workup and recrystallization from benzene-n-pentane.

(4) 4 - (3-fluoroanilino)-1-methylpiperidine, M.P. 55–59° C., 5.0 g., was prepared as in Example B–2 using 5.2 g. of sodium borohydride, 150 ml. of ethanol, 26.9 g. of 4-(3-fluorophenylimino)-1-methylpiperidine, ether instead of chloroform in the workup and recrystallization from cyclohexane.

(5) 4-(3,4-dichloroaniline)-1-methylpiperidine, 15.0 g. of a yellow oil which crystallized on standing, was prepared as in Example B–2 using 6.6 g. of sodium borohydride, 150 ml. of ethanol, 42.5 g. of 4-(3,4-dichlorophenylimino) - 1 - methylpiperidine and ether instead of chloroform in the workup.

(6) 4-(2-fluoroanilino)-1-methylpiperidine, 32.8 g. as a light yellow oil, was prepared as in Example B–2 using 7.1 g. of sodium borohydride, 150 ml. of ethanol, 36.4 g. of 4-(2-fluorophenylimino)-1-methylpiperidine and ether instead of chloroform in the workup.

Following the procedure described in Example B–2 but using the appropriate 1-Z-4(or 3)-(Q-phenylimino)piperidine the following 1-Z-4(or 3)-(Q-anilino)piperidines are prepared:

(7) 1-ethyl-4-anilinopiperidine.
(8) 4-(3,4-difluoroanilino)-1-methylpiperidine.
(9) 4-(2,4-dichloroanilino)-1-methylpiperidine.
(10) 1-(3-cyano-3,3-diphenylpropyl)-4-(2,4 - difluoroanilino)piperidine.
(11) 1-n-hexyl-4-anilinopiperidine.
(12) 4-(2-chloroanilino)-1-methylpiperidine.
(13) 3-(2-fluoroanilino)-1-methylpiperidine.
(14) 3-(2,4-difluoroanilino)-1-methylpiperidine.
(15) 1-ethyl-3-(2-fluoroanilino)piperidine.
(16) 1-(3-cyano-3,3-diphenylpropyl) - 3 - (2 - fluoroanilino)piperidine.

(C) N-[1-Z-4(OR 3)-PIPERIDYL]ACYLANILIDES FROM 1-Z-4(OR 3) (Q-ANILINO)PIPERIDINES (1) N-(1-methyl-4-piperidyl)propionanilide.—A mixture containing 9.5 g. of 1-methyl-4-anilinopiperidine and 25 ml. of propionic anhydride was heated on a steam bath for four hours. To the reaction mixture was added 200 ml. of methanol and the solution was concentrated in vacuo to yield an oil. The oil was treated with aqueous sodium hydroxide solution and the resulting mixture extracted with chloroform. The extract was dried over anhydrous sodium sulfate and the chloroform removed by distilling in vacuo. The remaining oil was dissolved in ether and to the ether solution was added a solution of hydrogen chloride in ether. The resulting white precipitate was collected and recrystallized several times from ethyl acetate-methanol to yield 8.2 g. of N-(1-methyl-4-piperidyl)propionanilide, M.P. 176.8–177.6° C. (corr.).

(2) α,α - dichloro-N-(1-methyl-4-piperidyl)-N-phenylacetamide.—To a solution containing 7.6 g. of 4-anilino-1-methylpiperidine in 50 ml. of chloroform was added 5.9 g. of dichloroacetyl chloride. The resulting solution was concentrated in vacuo to yield a white solid. The solid was recrystallized from ethanol to yield 7.0 g. of α,α-dichloro-N-(1-methyl-4-piperidyl) - N - phenylacetamide as its hydrochloride, M.P. 266–267° C. with decomposition.

(3) 4'-chloro - N - (1-methyl-4-piperidyl)propionanilide.—To a stirred mixture containing 5.8 g. of 4-(4-chloroanilino)-1-methylpiperidine and 12 ml. of propionic anhydride was added one drop of concentrated sulfuric acid and the resulting mixture was stirred on a steam bath for two and three-fourths hours. The reaction mixture was cooled, treated with about 25 ml. of methanol and stirred for two and one-half hours. The reaction mixture was concentrated to an orange oil which was treated with excess 10% aqueous potassium carbonate solution and stirred until evolution of carbon dioxide ceased. The aqueous mixture was extracted three times with ether and the combined ether extract was filtered and concentrated to remove the ether. The remaining oil crystallized to yield 7.2 g. of 4'-chloro-N-(1-methyl-4-piperidyl)propionanilide. To said compound was added 4.9 g. of p-toluenesulfonic acid monohydrate dissolved in ethanol. The resulting solution was heated in vacuo to remove the ethanol and the residue taken up with isopropyl alcohol and the resulting solution treated with three to four times its volume of ether. The resulting precipitate was collected, dried, recrystallized again from isopropyl alcohol-ether, washed with absolute ether and dried in vacuo at 60° C. to yield 6.2 g. of 4'-chloro-N-(1-methyl-4-piperidyl)propionanilide as its p-toluenesulfonate, M.P. 193.5–195.0° C.

(4) 4' - fluoro-N-(1-methyl-4-piperidyl)propionanilide as its p-toluenesulfonate, M.P. 167–168° C., 8.5 g., was prepared as in Example C–4 using 6.4 g. of 4-(4-fluoroanilino)-1-methylpiperidine, 12 ml. of propionic anhydride, one drop of concentrated sulfuric acid and recrystallization from ethanol-ether.

(5) 3' - fluoro-N-(1-methyl-4-piperidyl)propionanilide as its p-toluenesulfonate, M.P. 158–161° C., 5.3 g., was prepared as in Example C–3 using 5.0 g. of 4-(3-fluoroanilino)-1-methylpiperidine, 12 ml. of propionic anhydride and recrystallization from isopropyl alcohol-ether.

(6) 3'-4'-dichloro-N-(1-methyl-4-piperidyl)propionanilide as its p-toluenesulfonate, M.P. 171–174° C., 12.1 g., was prepared as in Example C–3 using 15.0 g. of 4-(3,4-dichloroanilino)-1-methylpiperidine, 30 ml. of propionic anhydride, one drop of concentrated sulfuric acid, a heating period of seventeen hours, benzene instead of ether as the extracting solvent, distillation of the product as its free base, M.P. 104–108° C. at 0.005 mm., and recrystallization of the p-toluenesulfonate from ethanol-ether.

(7) 2'-fluoro-N-(1-methyl-4-piperidyl)-propionanilide, B.P. 79–81° C. at 0.002 mm., 21 g., was prepared as in Example C–6 using 32.8 g. of 4-(2-fluoroanilino)-1-methylpiperidine, 60 ml. of propionic anhydride, one drop of concentrated sulfuric acid and a reflux period of eighteen hours. Its p-toluenesulfonate, M.P. 135–137° C., 7.2 g., was prepared as in Example C–3 using 10.0 g. of the product in free base form and 7.6 g. of p-toluenesulfonic acid monohydrate.

The methiodide and methochloride salts of the above compound were prepared as follows: A mixture containing 8.7 g. of 2'-fluoro-N-(1-methyl-4-piperidyl)propionanilide, 9.9 g. of methyl iodide and 90 ml. of acetonitrile was refluxed for ninety minutes, cooled and treated with absolute ether whereupon a white crystalline product separated. The product was collected, washed with absolute ether and dried in vacuo at 40° C. to yield 12.0 g. of 4 - [N-(2-fluorophenyl)propionamido]-1,1-dimethylpiperidinium iodide, M.P. 167–169° C. This methiodide was dissolved in methanol and run through a column of chloride exchange resin (Amberlite® IRA–400). The methanol was distilled off in vacuo and benzene was added to the residue and also distilled off in vacuo. The residue was dissolved in absolute ethanol and the solution treated with absolute ether whereupon a crystalline product separated. The crystalline solid was collected, washed with absolute ether, dried, recrystallized from ethanol-ether, washed with absolute ether and dried in vacuo at 40° C. to yield 10.3 g. of 4-[N-(2-fluorophenyl)propionamido] - 1,1 - dimethylpiperidinium chloride, M.P. 200–201° C.

(8) Ethyl N-(1-methyl - 4 - piperidyl)-N-phenylcarbamate.—To a solution containing 10.0 g. of 4-anilino-1-methylpiperidine in 75 ml. of chloroform was added 5.9 g. of ethyl chloroformate and the resulting solution was refluxed for seven hours and then concentrated in vacuo to yield a viscous oil. The oil was dissolved in hot absolute ethanol, the solution treated with decolorizing charcoal and filtered. The filtrate was treated with an equal volume of absolute ether and cooled in an ice bath. The resulting crystalline precipitate was collected, washed with absolute ether, recrystallized from absolute ethanol-absolute ether using decolorizing charcoal, washed with absolute ether and dried for one hour over phosphorus pentoxide at 0.01 mm. to yield 1.5 g. of ethyl N-(1-methyl-4-piperidyl)-N-phenylcarbamate as its hydrochloride, M.P. 184–185° C. The above combined filtrates were concentrated in vacuo and the remaining oil treated with an excess of aqueous 10% sodium carbonate solution. The mixture was extracted with ether, the ether extract filtered and the filtrate concentrated in vacuo to remove the ether. The remaining oil was distilled in vacuo to yield a 4.7 g. fraction distilling at 111–114° C. at 0.02 mm. and crystallizing on standing. The crystalline material was recrystallized once from benzene-n-pentane and a second time from n-pentane and dried over phosphorus pentoxide at 0.005 mm. to yield 2.1 g. of ethyl N-(1-methyl-4-piperidyl)-N-phenylcarbamate, M.P. 72–74° C.

(9) N-[1-(3-cyano-3,3-diphenylpropyl)-4-piperidyl]-2'-fluoropropionanilide.—To a mixture containing 6 g. of 1-(3-cyano - 3,3 - diphenylpropyl)-4-(2-fluoroanilino)piperidine and 30 ml. of propionic anhydride was added one drop of concentrated sulfuric acid and the resulting mixture was heated on a steam bath for eight hours, poured into methanol. The methanol was evaporated off and the residue was treated with aqueous sodium bicarbonate solution and the aqueous mixture extracted with ether. The ether was removed in vacuo and to the remaining oily material was added concentrated ammonium hydroxide and the resulting mixture stirred whereupon a white gummy precipitate separated. The precipitate was triturated with ether and then recrystallized twice from ether to yield 3.14 g. of N-[1-(3-cyano-3,3-diphenylpropyl) - 4 - piperidyl] - 2' - fluoropropionanilide, M.P. 128–128.5° C.

Following the procedure described in Example C, e.g., C–1, C–2, C–3, C–4, C–6, C–8, C–9 but using the appropriate 1-Z-4(or 3-)-(Q-anilino)piperidine and acylating agent, the following N-[1-Z-4(or 3)-piperidyl]acylanilides are prepared:

(10) N-(1-ethyl-4-piperidyl)propionanilide.
(11) 3',4'-difluoro-N-(1-methyl - 4 - piperidyl)propionanilide.
(12) 2',4' - dichloro-N-(1-methyl-4-piperidyl)propionanilide.
(13) N - [1-(3-cyano-3,3-diphenylpropyl)-4-piperidyl]-2',4'-difluoropropionanilide.
(14) N-(1-n-hexyl-4-piperidyl)propionanilide.
(15) 2'-chloro-N-(1-methyl-4-piperidyl)propionanilide.
(16) 2'-fluoro-N-(1-methyl-3-piperidyl)propionanilide.
(17) 2',4' - difluoro-N-(1-methyl-3-piperidyl)propionanilide.
(18) N-(1-ethyl-3-piperidyl)-2-fluoropropionanilide.
(19) N - [1-(3-cyano-3,3-diphenylpropyl)-3-piperidyl]-2'-fluoropropionanilide.
(20) α,α-dichloro-N,N-(1-methyl-3-piperidyl)-N-phenylacetamide.
(21) α,α - dichloro-N-(2-fluorophenyl)-N-(1-methyl-4-piperidyl)acetamide.
(22) Ethyl N - (1-methyl-3-piperidyl)-N-phenylcarbamate.
(23) Ethyl N - (2-fluorophenyl)-N-(1-methyl-4-piperidyl)-carbamate.

(D) N - [1-Z-4(OR 3)-PIPERIDYL]ACYLANILIDES FROM N-[4(OR 3)-PIPERIDYL]ACYLANILIDES (1) N - [1-(3-cyano-3,3-diphenylpropyl)-4-piperidyl]-propionanilide.—A mixture containing 10.3 g. of N-(4-piperidyl)-propionanilide hydrochloride, 12 g. of 3-cyano-3,3-diphenylpropyl bromide, 8 g. of triethylamine and 100 ml. of chloroform was refluxed with stirring for eighteen hours. The reaction mixture was washed with water, the chloroform layer was separated and concentrated in vacuo to remove the chloroform. The remaining oil was dissolved in ether, the ether solution filtered and the filtrate treated with a solution of hydrogen chloride in ether whereupon a white precipitate formed. The precipitate was collected, triturated with ether and recrystallized from benzene-n-hexane using decolorizing charcoal to yield 4.2 g. of N - [1 - (3-cyano-3,3-diphenylpropyl)-4-piperidyl] propionanilide, M.P. 153.0–154.0° C. (corr.).

A 9.0 g. sample of N-[1-(3-cyano-3,3-diphenylpropyl)-4-piperidyl]propionanilide was mixed with 100 ml. of concentrated hydrochloric acid and 40 ml. of ethanol and the resulting mixture was refluxed for eighteen hours with stirring. The separated white crystalline solid was collected and recrystallized, dried from methanol-ether, using decolorizing charcoal, to yield 3.5 g. of 4-anilino-1-(3-cyano-3,3-diphenylpropyl)piperidine as its dihydrochloride, M.P. 261–263° C. (corr.).

(2) N-[1-(2-cyanoethyl)-4-piperidyl]propionanilide.— A mixture containing 12.8 g. of N-(4-piperidyl)propionanilide hydrochloride, 50 ml. of tetrahydrofuran and 2.7 g. of sodium methoxide was stirred for one hour and to it was then added 5.3 g. of acrylonitrile. The resulting reaction mixture was stirred for six hours and then filtered and the filtrate concentrated in vacuo to yield an oil. The oil was dissolved in 50 ml. of ethanol, the ethanol solution filtered and to the filtrate was added to a solution containing 19.0 g. of p-toluenesulfonic acid monohydrate in 50 ml. of ethanol. The resutling white crystalline precipitates was collected and recrystallized from ethanol to yield 17.8 g. of N-[1-(2-cyanoethyl)-4-piperidyl]propionanilide as its p-toluenesulfonate, M.P. 227–228° C.

Following the procedure described in Example D–1 and D–2 but using the appropriate N-[4(or 3)-piperidyl]acylanilide and alkylating agent, Z-halide, the following N-[1-Z-4(or 3-piperidyl]acylanilides are prepared:

(3) N - [1-(3-cyano-3,3-diphenylpropyl)-3-piperidyl]-propionaniline.
(4) N-[1-(2-cyanoethyl)-3-piperidyl]propionanilide.
(5) N - [1 - (3-cyano-3,3-diphenylpropyl)-4-piperidyl] lactanilide.
(6) N-(1-methyl-4-piperidyl)lactanilide.
(7) N-(1-methyl-3-piperidyl)lactanilide.

(E) 4(OR 3)-(Q-ANILINO)PYRIDINES (1) 4-(2-fluoroanilino)pyridine.—A mixture containing 20 g. of 4-chloropyridine as its hydrochloride and 64 g. of 2-fluoroaniline was heated on a steam bath for three hours. To the mixture was added 200 ml. of concentrated ammonium hydroxide and the resulting mixture was steam distilled to remove the unreacted 2-fluoroaniline. The remaining hot reaction mixture was treated with decolorizing charcoal and filtered. The filtrate was chilled and a small amount of precipitate was filtered off. The filtrate was then made alkaline with excess ammonium hydroxide whereupon the yellowish white precipitate separated. The precipitate was collected and dried to yield 21.1 g. of 4-(2-fluoroanilino)pyridine.

(2) 4-anilinopyridine, 75 g., was prepared as in Example E–1 using 70.0 g. of 4-chloropyridine hydrochloride and 187 g. of aniline.

Following the procedure described in Example E–1 using 3-chloropyridine hydrochloride in place of 4-chloropyridine hydrochloride and the appropriate Q-aniline, the following 3-(Q-anilino)pyridines are prepared:
(3) 3-(2-fluoroanilino)pyridine.
(4) 3-anilinopyridine.

(F) N-[4(OR 3)-PYRIDYL]ACYLANILIDES (1) N-(4-pyridyl)propionanilide.—To a solution containing 75 g. of 4-anilinopyridine and 250 ml. of propionic anhydride was added one drop of concentrated sulfuric acid and the resulting solution was heated on a steam bath for five hours. The hot reaction mixture was poured into 500 ml. of methanol and the solution allowed to stand for ninety minutes. The solution was then concentrated in vacuo to remove the methanol and the remaining material was made alkaline with 35% aqueous sodium hydroxide solution. The alkaline solution was extracted twice with ethyl acetate and the resulting extract was washed successively with water and brine, and then concentrated in vacuo to remove the ethyl acetate. The remaining solid was recrystallized from ethyl acetate-n-pentane to yield 92.5 g. of N-(4-pyridyl)propionanilide, M.P. 113–115° C.

(2) 2'-fluoro-N-(4-pyridyl)propionanilide, 20.3 g., was prepared as in Example F–1 using 24.1 g. of 4-(2-fluoroanilino)pyridine, 60 ml. of propionic anhydride and 200 ml. of methanol.

(3) N-(3-pyridyl)propionanilide.—A mixture containing 64.6 g. of N-(3-pyridyl)propionamide, 135 g. of bromobenzene, 4 g. of cuprous iodide, one teaspoon of activated copper under n-amyl alcohol and 59.5 g. of anhydrous potassium carbonate was refluxed for sixteen and one-half hours. The reaction mixture was allowed to cool, water was added and the mixture was extracted with ethyl acetate. The extract was washed with brine, filtered and the filtrate concentrated in vacuo to remove the ethyl acetate. After an unsuccessful attempt to separate the product by vacuum distillation of the remaining oil, the various fractions were combined, dissolved in cyclohexane containing 5% isopropyl alcohol and the solution ran through a 90 cm. column of 800 g. of silica gel. The column was then eluted with cyclohexane containing 5% isopropyl alcohol while collecting 250 ml. fractions. Fractions 10–15 were combined and concentrated to yield a yellow oil which was distilled under reduced pressure to yield 56.8 g. of N-(3-pyridyl)propionanilide, B.P. 145–147° C. at 0.010–0.012 mm.

The above intermediate N-(3-pyridyl)propionamide was prepared as follows: a mixture containing 30.0 g. of 3-aminopyridine and 75 ml. of propionic anhydride was heated on the steam bath for two and one-half hours and cooled. To the reaction mixture was added 75 ml. of methanol; the mixture was refluxed and then concentrated in vacuo to remove the volatile liquids. To the residue was added ethyl acetate and the mixture was treated with 10% aqueous sodium bicarbonate solution and solid sodium bicarbonate. The mixture was extracted with ethyl acetate; the extract was washed with brine, and filtered; and, the filtrate was concentrated in vacuo to yield an oil which crystallized on cooling. The crystalline material was recrystallized from ethyl acetate to yield 40.6 g. of N-(3-pyridyl)propionamide, M.P. 104–106° C.

Following the procedure described in Example F–1 but using the appropriate 3-(Q-anilino)piperidine in place of the 4-(Q-anilino)pyridine, the following N - (3 - pyridyl) acylanilides are prepared:

(4) N-(3-pyridyl)propionanilide.
(5) 2'-fluoro-N-(3-pyridyl)propionanilide.

(G) 4(OR 3)-[N-(Q-PHENYL)ACYLAMIDO]-1-Z-PYRIDINIUM HALIDES (1) 4 - (N - phenylpropionamido)-1-(3-cyano-3,3-diphenylpropyl)pyridinium bromide.—A mixture containing 2.3 g. of N-(4-pyridyl)propionanilide and 3.0 g. of 3-cyano-3,3-diphenylpropyl bromide and 25 ml. of dimethylformamide was refluxed with stirring for eighteen hours and concentrated in vacuo to remove the dimethylformamide. The remaining thick oily material was triturated with acetone to yield 4-(N-phenylpropionamido)-1-(3-cyano-3,3-diphenylpropyl)-pyridinium bromide as a white solid, M.P. 193–194° C. after recrystallization from acetonitrile.

(2) 4-[N-(2-fluorophenyl)propionamido]-1-(3-cyano-3,3-diphenylpropyl)pyridinium bromide, 48.8 g., was prepared as in Example G–1 using 20.3 g. of 2'-fluoro-N-(4-pyridlyl)-propionanilide, 26.4 g. of 3-cyano-3,3-diphenylpropyl bromide and 200 ml. of dimethylformamide.

(3) 3 - (N - phenylpropionamido)-1-methylpyridinium iodide.—A mixture containing 50.9 g. of N-(3-pyridyl)propionanilide, 63.8 g. of methyl iodide and 250 ml. of actonitrile was refluxed gently on a steam bath for three hours. About 50 ml. of acetonitrile was distilled off and the remaining reaction mixture was allowed to cool. Absolute ether was added and the resulting precipitate was collected, recrystallized from acetonitrile-ether and dried for two hours at 50° C. to yield 79.1 g. of 3-(N-phenylpropionamido)-1-methylpyridinium iodide, M.P. 189–190° C.

Following the procedure described in Example G–1 or G–3 using the appropriate N-(3-pyridyl)acylanilide and alkylating agent, Z-halide, the following compounds are prepared:

(4) 3 - (N - phenylpropionamido)-1-(3-cyano-3,3-diphenylpropyl)pyridinium bromide.
(5) 3-[N-(2-fluorophenyl)propionamido]-1-(3-cyano-3,3-diphenylpropyl)pyridinium bromide.
(6) 1-methyl - 3 - (N-phenylpropionamido)pyridinium iodide.

(H) 4-(Q-ANILINO)-1-Z-PIPERIDINES FROM 4-[N-(Q - PHENYL) - ACYLAMIDO]-1-Z-PYRIDINIUM HALIDES (1) 1-(3-cyano - 3,3 - diphenylpropyl-3-4-(2-fluoroanilino)piperidine.—To a solution containing 48.8 g. of 1-(3 - cyano - 3,3 - diphenylpropyl)-4-[N-(2-fluorophenyl)propionamido]pyridinium bromide in ethanol was added in portions with cooling (before 10° C.) and stirring 8 g. of sodium borohydride in ethanol and the resulting reaction mixture was allowed to stand overnight in an ice box. The mixture was evaporated in vacuo to remove the ethanol and the residue was dissolved in water. The aqueous solution was neutralized with dilute aqueous hydrochloric acid and the resulting solution was extracted with chloroform. The chloroform extract was evaporated in vacuo to remove the chloroform to yield 36.0 g. of solid product. A 10.5 g. portion of the product was recrystallized from isopropyl alcohol to yield 6.91 g. of 1-(3-cyano-3,3 - diphenylpropyl)-4-(2-fluoroanilino)-piperidine, M.P. 127–129° C.

(2) 1-(3-cyano-3,3-diphenylpropyl) - 4 - anilinopiperidine.—To a vigorously stirred suspension containing 77.7 g. of 1-(3-cyano-3,3-diphenylpropyl)-4-(phenylpropionamido)pyridinium bromide in one liter of ethanol was added in portions over a period of thirty minutes 15 g. of sodium borohydride and the resulting mixture was stirred for two hours and then allowed to stand for eighteen hours. The reaction mixture was concentrated in vacuo to yield a white semi-solid. To the latter material was added 600 ml. of water and the mixture was extracted twice with benzene and once with ether. The combined extracts were washed with brine and concentrated in vacuo to remove the ether and benzene. The remaining oil was dissolved in 150 ml. of warm ether, a small quantity of insoluble material was filtered off and the filtrate was chilled. The resulting precipitate was collected and recrystallized from isopropyl acetate-n-hexane to yield 20.5 g. of 1-(3-cyano-3,3-diphenylpropyl)-4-anilinopiperidine, M.P. 261–263° C.

(I) N-(1-Z - 3 - PIPERIDYL)ACYLANILIDES FROM 3-[N-(Q - PHENYL)ACYLAMIDO]-1-Z-PYRIDINIUM HALIDES (1) N-(1-methyl - 3 - piperidyl)propionanilide.—To a stirred mixture containing 25.7 g. of sodium borohydride and 500 ml. of ethanol was added slowly over a thirty minute period 79.1 g. of 1-methyl-3-(N-phenylpropionamido)pyridinium iodide, while chilling the reaction mixture in an ice bath. The mixture was then stirred for eighteen hours at room temperature, concentrated on a steam bath to a small volume, treated with water and the mixture extracted twice with ether and twice with ethyl acetate. The combined extracts were washed with brine, filtered and concentrated in vacuo to remove the solvents. The remaining oil, 52 g. of a mixture of products, was dissolved in acetic acid and catalytically hydrogenated using 2.5 g. of platinum oxide and 220 p.s.i. of hydrogen at room temperature over a period of six hours. The mixture was filtered and the acetic acid removed by heating in vacuo. The residue was treated with 10% aqueous sodium carbonate solution, the mixture extracted with ethyl acetate, the extract washed with brine, filtered and concentrated in vacuo to remove the ethyl acetate. The remaining oil was distilled in vacuo to yield fractions distilling at 103–115° C. at 0.005–0.003 mm. and 115–120° C. at 0.003 mm. The two fractions, which crystallized on standing, were combined, dissolved in ethanol and the solution treated with hydrogen bromide in ether. The resulting precipitate was collected, recrystallized from absolute ethanol-ether using decolorizing charcoal, washed with a mixture of absolute ethanol-ether and dried at room temperature at 0.2 mm. over phosphorous pentoxide to yield 27.2 g. of N-(1-methyl-3-piperidyl)propionanilide as its hydrobromide, M.P. 212–213° C.

Following the procedure described in Example I–1 using the appropriate 3-[N-(Q-phenyl)acylamido]-1-Z-pyridinium halide, the following N-(1-Z-3-piperidyl) acylanilides are prepared:

(2) N-[1-(3 - cyano - 3,3 - diphenylpropyl)-3-piperidyl]propionanilide.
(3) N-[1-(3 - cyano - 3,3 - diphenylpropyl)-3-piperidyl]-2'-fluoropropionanilide.

(J) 1-BENZYL-4(OR 3)-[(Q-PHENYL)IMINO] PIPERIDINES (1) 1-benzyl - 4 - phenyliminopiperidine.—A mixture containing 100 g. of 1-benzyl-4-piperidone, 51 g. of aniline, 200 ml. of toluene and 1 ml. of glacial acetic acid was refluxed using a continuous separator connected to the reaction vessel for the removal of water formed by the reaction. After six hours, the theoretical quantity of water had been collected. The reaction mixture was concentrated in vacuo to yield, as an oil, 139 g. of 1-benzyl-4-phenyliminopiperidine.

Following the procedure described in Example J–1 using 1-benzyl-4-piperidone or 1-benzyl-3-piperidone and the appropriate Q-aniline, the following 1-benzyl-4(or 3)-(Q-phenylimino)piperidines are prepared:

(2) 1-benzyl-4-(2-fluorophenylimino)piperidine.
(3) 1-benzyl-3-(2-fluorophenylimino)piperidine.
(4) 1-benzyl-3-phenyliminopiperidine.

(K) 1-BENZYL-4(OR 3)-(Q-ANILINO) PIPERIDINES (1) 4-anilino-1-benzylpiperidine.—To a solution containing 139 g. of 1-benzyl-4-phenyliminopiperidine in 700 ml. of ethanol was added with stirring over a fifteen minute period 20.0 g. of sodium borohydride and the resulting reaction mixture was stirred for two hours. The mixture was then diluted to a volume of two liters with water. The separated yellow oily material crystallized on trituration and the resulting mixture was chilled. The separated solid was collected, and air-dried. It was further dried by dissolving it in benzene and removing the benzene in vacuo to yield an oily residue which crystallized on cooling thereby yielding 141 g. of 4-anilino-1-benzylpiperidine, M.P. 78–82° C.

Following the procedure described in Example K–1 using the appropriate 1-benzyl-4(or 3)-(Q-phenylimino) piperidine, the following 1-benzyl-4(or 3)-(Q-anilino) piperidines are prepared:

(2) 1-benzyl-4-(2-fluoroanilino)piperidine.
(3) 1-benzyl-3-(2-fluoroanilino)piperidine.
(4) 3-anilino-1-benzylpiperidine.

(L) N-[1-BENZYL-4(OR 3)-PIPERIDYL]ACYLANILIDES FROM 1-BENZYL-4(OR 3)-(Q-ANILINO) PIPERIDINES (1) N-(1-benzyl-4-piperidyl)propionanilide.—To a solution containing 141 g. of 4-anilino-1-benzylpiperidine in 800 ml. of chloroform was added slowly with stirring 50.7 g. of propionyl chloride and the resulting mixture allowed to stand overnight. The mixture was evaporated in vacuo to remove the chloroform and the residue was dissolved in hot acetonitrile. The acetonitrile solution was cooled and the solid that separated was collected, boiled with dioxane to remove its color, filtered and then recrystallized from acetonitrile using decolorizing charcoal to yield 125 g. of N-(1-benzyl-4-piperidyl)propionanilide, as its hydrochloride, M.P. 239–240° C.

(2) N-(1-benzyl-4-piperidyl)lactanilide.—To a solution containing 4-anilino-1-benzylpiperidine in 400 ml. of chloroform was added with stirring over a five minute period a solution containing 22 g. of O-acetyllactyl chloride in 100 ml. of chloroform. The resulting mixture was allowed to stand for four hours and then concentrated in vacuo to remove the chloroform. The residue was dissolved in 500 ml. of methanol and to the solution was added 120 ml. of 10% sodium hydroxide solution. The resulting aqueous solution was allowed to stand for two hours and then poured into 2500 ml. of cold water. The separated white oil solidified on standing. The solid was collected, washed with water, air-dried and recrystallized from benzene-n-hexane to yield 35.3 g. of N-(1-benzyl-4-piperidyl)lactanilide, M.P. 123–125° C.

Following the procedure described in Example L–1 or L–2 using the appropriate 1-benzyl-4(or 3)-(Q-anilino)-piperidine and appropriate acylating agent, the following compounds are prepared:

(3) N-(1-benzyl-4-piperidyl)-2'-fluoropropionanilide.
(4) N-(1-benzyl-3-piperidyl)-2'-fluoropropionanilide.
(5) N-(1-benzyl-3-piperidyl)lactanilide.

(M) N-[4(OR 3)-PIPERIDYL]ACYLANILIDES FROM N-[1-BENZYL-4(OR 3)-PIPERIDYL] ACYLANILIDES (1) N-(4-piperidyl)lactanilide.—A mixture containing 53.7 g. of N-(1-benzyl-4-piperidyl)lactanilide, 1500 ml. of methanol, 20 ml. of acetic acid and 6 g. of 10% pallidium-on-charcoal was catalytically hydrogenated at 20° C. using 460 p.s.i. of hydrogen. The catalyst was filtered off and the filtrate concentrated in vacuo to remove the methanol and acetic acid. The remaining white solid was recrystallized once from ethanol and once from methanol-ethanol to yield 10.0 g. of N-(4-piperidyl)lactanilide as its acetate salt, M.P. 195–196° C.

(2) N-(4-piperidyl)propionanilide.—A mixture containing 125.3 g. of N-(1-benzyl-4-piperidyl)propionanilide hydrochloride, 750 ml. of methanol and 6 g. of 10% palladium-on-charcoal was catalytically hydrogenated at 40–50° C. over an one hour period using 550 p.s.i. of hydrogen. The catalyst was filtered off and the filtrate concentrated in vacuo to remove the methanol. The oily residue crystallized and was then recrystallized from ethyl acetate containing a small amount of ethanol to yield 83.5 g. of N-(4-piperidyl)propionanilide as its hydrochloride.

Following the procedure described in Example M–1 or M–2 using the appropriate N-[1-benzyl-4(or 3)-piperidyl]acylanilide, the following N-[4(or 3)-piperidyl]acylanilides are prepared:

(3) 2'-fluoro-N-(4-piperidyl)propionanilide.
(4) 2'-fluoro-N-(3-piperidyl)propionanlide.
(5) N-(3-piperidyl)lactanilide.

(N) OTHER RELATED ACYLANILIDES (1) N - (3-quinuclidinyl)propionanilide.—A mixture containing 10.5 g. of 3-anilinoquinuclidine and 30 ml. of propionic anhydride was heated on a steam bath for four hours. Excess methanol was added and the resulting mixture was concentrated in vacuo to yield a light brown oil. To the oil was added 10% aqueous potassium carbonate solution and the mixture was extracted with ether. The ether extract was washed with brine, filtered and concentrated in vacuo to remove the ether. The remaining oil was distilled under reduced pressure to yield a 7.4 g. fraction distilling at 83–87° C. at 0.01 mm. The fraction was dissolved in a 1:1 (v:v) of ethyl acetate and benzene, the solution filtered and the filtrate cooled. The resulting crystalline precipitate was collected, washed with benzene-n-pentane (10:1) and recrystallized from ethyl acetate-benzene. The hygroscopic product was dried over phosphorus pentoxide in vacuo, treated with 10% aqueous sodium hydroxide solution and the alkaline solution extracted with ether. The extract was washed with brine, filtered, concentrated in vacuo to remove the ether, treated with benzene, the benzene distilled off in vacuo and the remaining oil distilled under reduced pressure to yield 2.4 g. of N-(3-quinuclidinyl)propionanilide, B.P. 123–126° C. at 0.004 mm.

The intermediate 3-anilinoquinuclidine was prepared in two steps as follows: A mixture containing 25.0 g. of 3-quinuclidinone, 100 ml. of toluene and 20.8 g. of anhydrous potassium carbonate was stirred with warming for one hour, cooled and treated with 14.5 g. of aniline and 0.5 ml. of acetic acid. The resulting mixture was refluxed for sixteen hours, treated with a two ml. portion of acetic and refluxing continued for another eight hours, after which time 4.5 ml. of water had been collected in a continuous water separator connected to the reaction vessel. The reaction mixture was filtered, concentrated to remove the volatile liquids and distilled under reduced pressure to yield 24.4 g. of 3-phenylimino)quinuclidine, B.P. 67–70° C. at 0.005 mm. A mixture containing 4.8 g. of sodium borohydride and 125 ml. of ethanol was stirred for thirty minutes and to the mixture was added 24.0 g. of 3-(phenylimino)quinuclidine in 100 ml. of ethanol. The resulting mixtures was stirred at room temperature for five hours and then allowed to stand overnight (sixteen hours). The mixture was concentrated in vacuo to remove the ethanol and to the remaining white solid was added 250 ml. of water. The mixture was extracted with ethyl acetate. The extract was washed with brine, filtered, and the filtrate concentrated in vacuo to remove the ethyl acetate. The remaining white solid was recrystallized from ethyl acetate-n-pentane and dried over phosphorous pentoxide at room temperature and 0.01 mm. to yield 10.5 g. of 3-anilinoquinuclidine.

(2) N - (3 - tropanyl)propionanilide.—A mixture containing 25.8 g. of 3-anilinotropane in 50 ml. of propionic anhydride and one drop of concentrated hydrochloric acid was stirred overnight while heating on a steam bath. The mixture was concentrated in vacuo and the remaining oil was treated with an excess of 10% aqueous potassium carbonate. The mixture was extracted with ether. The extract was washed with brine, treated with decolorizing charcoal, filtered and the filtrate concentrated in vacuo to remove the ether. The remaining oil was distilled in vacuo to yield a 25 g. fraction distilling at 87–91° C. at 0.005 mm. The fraction was distilled again to yield a 19.2 g. of N-(3-tropanyl)propionanilide distilling at 95–98° C. at 0.005 mm. A portion of the product was dissolved in ether and treated with ethereal hydrogen chloride. The resulting precipitate was collected and recrystallized from ethanol to yield N-(3-tropanyl)propionanilide as its hydrochloride, M.P. 196–197° C.

The intermediate 3-anilinotropane was prepared in two steps as follows: A mixture containing 50 g. of tropanone, 34.4 g. of aniline, 200 ml. of toluene and 4.0 ml. of acetic acid was refluxed under nitrogen for seventeen hours. The reaction mixture was concentrated in vacuo to remove the volatile liquids and the residue was distilled under reduced pressure to yield 36.4 g. of 3-phenyliminotropane, B.P. 105–106° C. at 0.005–0.010 mm. A mixture containing 6.8 g. of sodium borohydride and 200 ml. of ethanol was stirred for thirty minutes, treated with 36.4 g. of 3-phenyliminotropane, and the resulting mixture was stirred overnight and then concentrated in vacuo to remove the ethanol. Water was added to the residue and the mixture was extracted with ether. The extract was washed with brine and concentrated to remove the ether. The residual oil was distilled under reduced pressure to yield 25.1 g. of 3-anilinotropane, B.P. 97–101° C. at 0.020–0.008 mm.

The antidiarrheal activity of the compounds of the invention was determined by the following standard gastrointestinal propulsion test procedure: Mice weighing 28–30 gm. are starved for twenty-four hours and deprived of water for one hour before the test. Each compound is administered orally thirty minutes prior to administration of a 1:2:6 suspension of charcoal, wheat flour and distilled water. The test is concluded thirty minutes after administration of the charcoal meal. The animals are sacrificed, abdominal cavities opened and the intestines tied at the pylorus and at the farthest point traveled by the charcoal meal. Distances the charcoal meal have traveled in test drug animals are compared with nonmedicated and vehicle controls. Ten animals are used at each dose level. The precent effect is equal to the difference between 100% and the distance the meal traveled in treated animals expressed as percent of the distance traveled in control animals. A compound is considered active if it produces 15% or more inhibition affect of gasterointestinal expulsion compared to vehicle controls. When tested by this procedure, the compounds of the invention were found to produce up to about 50% inhibition at oral dose levels of about 10 to 200 mg./kg.

The actual determination of the numerical antidiarrheal data definitive for a particular compound is readily obtained by the standard test procedure, referred to above by technicians versed in pharmacological test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

I claim:
1. A compound of the formula

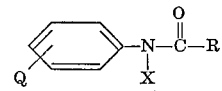

where Q is hydrogen or (halo)$_n$ where halo is fluoro or chloro and $n$ is 1 or 2, R is $C_2H_5$, $CH(OH)CH_3$, $OC_2H_5$ or $CHCl_2$ and X is 3-quinuclidinyl.

2. A compound according to claim 1 where Q is hydrogen or (halo)$_n$ where halo is fluoro or chloro and $n$ is 1 or 2, R is $C_2H_5$ and X is 3-quinuclidinyl.

3. A compound according to claim 2 where Q is hydrogen, R is $C_2H_5$ and X is 3-quinuclidinyl.

References Cited
UNITED STATES PATENTS 3,534,053    10/1970    Sallay et al. _____ 260—294.7

HENRY R. JILES, Primary Examiner

G. T. TODD, Assistant Examiner